US010567539B2

(12) United States Patent
Chen et al.

(10) Patent No.: US 10,567,539 B2
(45) Date of Patent: Feb. 18, 2020

(54) MANAGING METADATA IN CLOUD DRIVEN, THIN CLIENT VIDEO APPLICATIONS

(71) Applicant: Cisco Technology, Inc., San Jose, CA (US)

(72) Inventors: Dongliang Chen, Johns Creek, GA (US); Peter B. Jarrett, San Francisco, CA (US); Harvey Lynn Chatham, Suwanee, GA (US)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 15/359,869

(22) Filed: Nov. 23, 2016

(65) Prior Publication Data

US 2018/0146057 A1    May 24, 2018

(51) Int. Cl.
*H04L 29/08* (2006.01)
*H04L 29/06* (2006.01)

(52) U.S. Cl.
CPC .......... *H04L 67/2842* (2013.01); *H04L 67/10* (2013.01); *H04L 67/42* (2013.01)

(58) Field of Classification Search
CPC ..... H04L 67/2842; H04L 67/42; H04L 67/10; H04W 28/06; G06F 9/5072
See application file for complete search history.

(56) References Cited

U.S. PATENT DOCUMENTS

| 9,323,770 | B1 * | 4/2016 | Sharifi | G06F 17/3002 |
| 9,336,143 | B1 | 5/2016 | Wallace et al. | |
| 2002/0129168 | A1 * | 9/2002 | Kanai | H04L 29/06 709/247 |
| 2009/0292701 | A1 * | 11/2009 | Saoudi | G06F 16/7854 |
| 2010/0042632 | A1 * | 2/2010 | Johnson | G06F 11/3476 707/725 |
| 2010/0250858 | A1 | 9/2010 | Cremelie et al. | |
| 2014/0101113 | A1 | 4/2014 | Zhang et al. | |
| 2015/0046403 | A1 | 2/2015 | Zhang et al. | |
| 2015/0254338 | A1 | 9/2015 | Cheluvaraja et al. | |
| 2016/0241403 | A1 | 8/2016 | Lindemann | |
| 2017/0251281 | A1 * | 8/2017 | Seo | H04N 21/23418 |

OTHER PUBLICATIONS

PCT/US2017/062591 International Search Report and Written Opinion dated Feb. 22, 2018, 16 pages.

* cited by examiner

*Primary Examiner* — Shean Tokuta
*Assistant Examiner* — Juan C Turriate Gastulo
(74) *Attorney, Agent, or Firm* — Merchant & Gould P.C.

(57) ABSTRACT

A client device may send a first request and then receive, in response to sending the first request, a first response and a first fingerprint tree corresponding to the first response. Next, the client device may cache the first response and the first fingerprint tree corresponding to the first response. Then the client device may send a second request and the first fingerprint tree and then receive, in response to sending the second request and the first fingerprint tree, a final second response and a final second fingerprint tree. The final second fingerprint tree may comprise a difference between the first fingerprint tree and an initial second fingerprint tree and the final second response may comprise a difference between the first response and an initial second response. The client device may update the cached first response with the final second response and the cached first fingerprint tree with the final second fingerprint tree.

20 Claims, 9 Drawing Sheets

```
{
    "target" : "KHub",
    "metadata" : {
        "embedded" : {
            "hubtv" : {
                "items" : [
                    {"title" : "S1106S3E226 : Name : En" ...},
                    {"title" : "K1106S4E013 : Name : En" ...},
                    {"title" : "S1106S5E113 : Name : En" ...},
                    {"title" : "RN4 : O611 : Name : En" ...},
                    {"title" : "G1106S7E076 : Name : En" ...},
                    {"title" : "G1106S8E076 : Name : En" ...},
                    {"title" : "G1106S9E076 : Name : En" ...},
                    {"title" : "G1106S10E076 : Name : En" ...},
                    {"title" : "E1106S11E075 : Name : En" ...},
                    {"title" : "E1106S12E075 : Name : En" ...},
                    {"title" : "K1106S13E010 : Name : En" ...},
                    {"title" : "E1106S14E008 : Name : En" ...}
                ],
                "total"    : 12,
                "count"    : 12,
                "focusedItemIndex" : 0
            },
            "hubondemand" : {
                "focusItemIndex" : 0,
                "total"   : 12,
                "count" : 12,
                "items" : [
                    {"title" : "0008 Title"...},
                    {"title" : "0015 Title"...},
                    {"title" : "0002 Title"...},
                    {"title" : "0013 Title"...},
                    {"title" : "0009 Title"...},
                    {"title" : "0022 Title"...},
                    {"title" : "0027 Title"...},
                    {"title" : "0017 Title"...},
                    {"title" : "0003 Title"...},
                    {"title" : "0019 Title"...},
                    {"title" : "0001 Title"...},
                    {"title" : "0010 Title"...}
```

FIG. 3A

```
          |    |
          |    ]
          },
          |  "crumbtrail" : {
          |     "items" : [
          |     |    {"locale" : "en"...}
          |     ]
          },
          "menuItems" : {
          |     "items" : [
          |     |    {"title" : LIBRARY"...},
          |     |    {"title" : TELEVISION"...},
          |     |    {"title" : STORE"...}
          |     ]
          },
          "hublibrary" : {
          |     "focusedItemIndex" : 0,
          |     "count" : 1,
          |     "total" : 0,
          |     "items" : [
          |     |    {"title" : "YOUR LIBRARY IS EMPTY"...}
          |     ]
          }
       },
       "source" : {"keepAliveRate" : 300...},
       "links" : [
          |    {"method" : "POST"...},
          |    {"method" : "POST"...},
          |    {"event" : "ClientEvent"...},
          |    {"target" : "KFullscreen"...}
          ]
    }
 }
```

FIG. 3B

```
{
    "target" : "KHub" ,
    "metadata" : {
        "embedded" : {
            "hubtv" : {
                "items" : [
                    {"title" : "S1106S3E226 : Name : En" ...}
                ],
                "focusedItemIndex" : 1
            }
        }
    }
,}
```

FIG. 5

MANAGING METADATA IN CLOUD DRIVEN, THIN CLIENT VIDEO APPLICATIONS

TECHNICAL FIELD

The present disclosure relates generally to metadata management.

BACKGROUND

Cloud computing is a model that allows access to a shared pool of configurable computing resources. Cloud computing and storage solutions provide users and enterprises with various capabilities to store and process their data in third-party data centers. It shares resources to achieve coherence and economies of scale.

Cloud computing also focuses on maximizing the effectiveness of the shared resources. Cloud resources are usually not only shared by multiple users, but are also dynamically reallocated per demand. This can work for allocating resources to users. For example, a cloud computer facility that serves European users during European business hours with a specific application (e.g., e-mail) may reallocate the same resources to serve North American users during North American business hours with a different application (e.g., a web server). This approach helps maximize computing power use while reducing the overall resources cost by using, for example, less power, air conditioning, rack space, to maintain the system. With cloud computing, multiple users can access a single server to retrieve and update their data without purchasing licenses for different applications.

BRIEF DESCRIPTION OF THE FIGURES

The accompanying drawings, which are incorporated in and constitute a part of this disclosure, illustrate various embodiments of the present disclosure. In the drawings:

FIGS. 3A and 3B shows sample metadata for the first response;
FIG. 5 shows sample metadata for the final second response.

DETAILED DESCRIPTION

Overview

Figure 1:
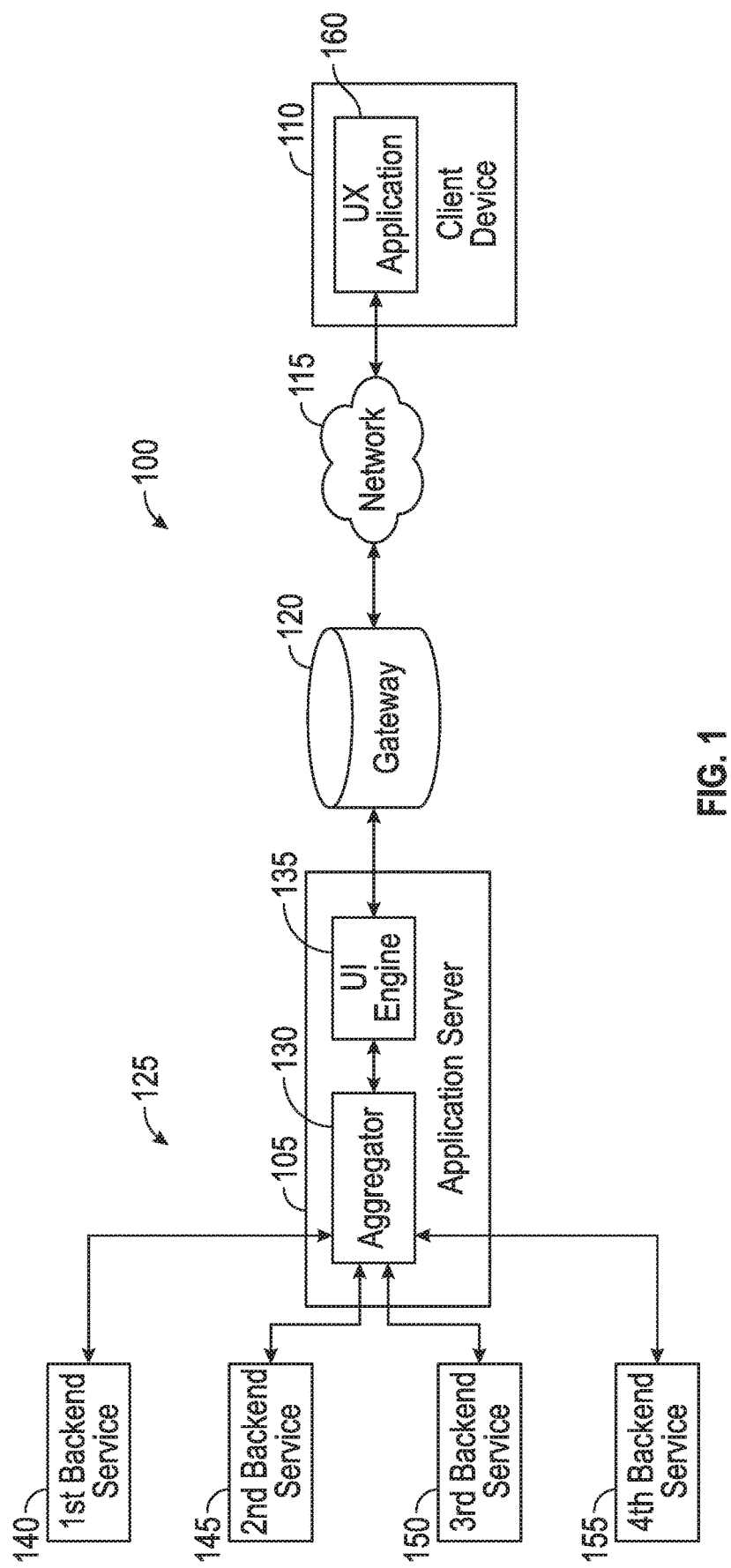
FIG. 1 shows a cloud based delivery system.

A client device may send a first request and then receive, in response to sending the first request, a first response and a first fingerprint tree corresponding to the first response. Next, the client device may cache the first response and the first fingerprint tree corresponding to the first response. Then the client device may send a second request and the first fingerprint tree and then receive, in response to sending the second request and the first fingerprint tree, a final second response and a final second fingerprint tree. The final second fingerprint tree may comprise a difference between the first fingerprint tree and an initial second fingerprint tree and the final second response may comprise a difference between the first response and an initial second response. The client device may update the cached first response with the final second response and the cached first fingerprint tree with the final second fingerprint tree.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Cloud driven, thin client video application architecture may have an advantage over conventional thick client video applications. With thin client video application architecture, the video application logic may be split between an application server and a thin client (i.e., a client device running a user experience (UX) application). By splitting the video application logic between the application server and thin client, a model and a controller may be implemented in the application server and the thin client may implement the presentation layer and a micro controller that may be closely related to a user interface (UI).

Events from the thin client may be forwarded to the application server and the application server may process the events and drive the thin client to a proper UI screen via the response to the request from the thin client. The communication between the application server and the thin client (e.g., request and response), however, may become a bottle neck that may limit performance.

Consistent with embodiments of the disclosure, one way to improve the UI performance may be to manage and control response caching with the thin client while allowing the application server the freedom to drive the UI on the thin client. For example, when navigating to a particular screen without caching, the thin client may: i) parse the response for a whole data model and controller for that screen; ii) delete the existing graphical elements; iii) create new graphical elements and bind to the metadata from the data model; and iv) perform controller association. These operations may reduce the thin client's performance.

Another aspect consistent with embodiments of the disclosure, is to reduce the network load when, for example, millions of thin clients are actively operating on a service provider's network. Assume, for example, 130 kB of response per screen per client with a single click on the thin client's UI (e.g., UI response size, not including any assets like posters, channel logos, etc.). This may result in 130 GB of data flow for a million clients with a single click/UI navigation on the network.

Embodiments of the disclosure may address these issues by providing a targeted, structured, granular caching process for the application server and thin client. The process may include, but is not limited to:

1) generating a response fingerprint tree from the application server;
2) delivering the fingerprint tree with the response to the thin client;
3) caching the fingerprint tree and the response on the thin client;
4) managing/updating the fingerprint tree and response on the thin client;
5) sending the fingerprint tree back along with the request to the application server; and
6) managing the received fingerprint tree on the application server.

The fingerprint tree of the response may be structured the same as the response message. The fingerprint tree may uniquely identify the structure of the response message, and the message itself from which the tree is generated. The fingerprint may be calculated using any fingerprint algorithms, for example, the Rabin fingerprint algorithm, a hash function, a cryptographic hash function, or a cyclic redundancy check (CRC).

A response fingerprint tree may be generated. For each metadata object in the response message, a fingerprint may be calculated based on the value of the interested key of the object and the fingerprint may be associated with that key. For the finest granularity of the fingerprint tree, a fingerprint may be calculated for every video event or metadata object in the response message. A fingerprint tree may be formed when fingerprints are calculated for one, some, or all of the interested metadata objects in the response message.

The fingerprint tree may be delivered to the thin client together with the response message as either a response header or as part of the message. If a request from the thin client comes with a fingerprint tree, the current fingerprint tree may be compared with the one from the request and only the difference of the fingerprint tree and the corresponding object in the response message may be delivered to the thin client.

The thin client may cache the fingerprint tree and the response. For example, the thin client may render the screen with the metadata in the response and cache both of the fingerprint tree and the response together when: i) they do not exist for that screen; or ii) when a new fingerprint tree is received. If only a partial fingerprint tree is received, the partial fingerprint tree and its corresponding response message may be merged into the current cached fingerprint tree and response message. For any follow-on request, the updated fingerprint tree may be sent to the application server. In another example, the application server may not send the fingerprint tree to the thin client. Instead, the application server may cache the fingerprint tree in memory or storage on the application server or at any location accessible by the application server.

FIG. 1 shows a cloud based delivery system 100 consistent with embodiments of the disclosure for providing metadata management. As shown in FIG. 1, cloud based delivery system 100 may comprise an application server 105, a client device 110, a network 115, a gateway 120, and a plurality of backend services 125. Application server 105 may comprise an aggregator 130 and a user interface (UI) engine 135. Plurality of backend services 125 may comprise a first backend service 140, a second backend service 145, a third backend service 150, and a fourth backend service 155. Plurality of backend services 125 may comprise any number of backend services and is not limited to four. Network 115 may comprise any network over which application server 105 and client device 110 may communicate, for example, the Internet. Application server 105 may connect to network 115 through gateway 120.

Client device 110 may include a user experience (UX) application 160. Client device 110 may comprise a communication terminal that may comprise, but is not limited to, a set-top box (STB), a digital video recorder, a cable modem, a personal computer, a Wi-Fi access point, a cellular base station, a switch servicing multiple clients in a vicinity, a tablet device, a mobile device, a smart phone, a television, a telephone, a remote control device, a network computer, a mainframe, a router, or other similar device.

Client device 110 may send a request to application server 105 for a screen to be displayed on client device 110. UI engine 135 may receive the request and pass it along to aggregator 130. Aggregator 130 may interface (e.g., over a network such as the Internet for example) with any one or more of plurality of backend services 125 to develop a response to the request and pass the response onto UI engine 135. UI engine 135 may send the response onto client device 110.

Plurality of backend services 125 may comprise a set of control and data plane services that may provide underlying capabilities application server 105. Plurality of backend services 125 may come from a range of vendors and provide disparate proprietary interfaces that provide access to the services. Plurality of backend services 125 may comprise, but are not limited to, identity management, content management, offer management, catalogue management, content protection, session management, and a recommendation engine. Identity management may comprise end user account, entitlement, and device identifying information. Content management may comprise curation, publication, and management of on demand content. Offer management may comprise definition and management of retail products sold through the platform to end users. Catalogue management may comprise published content descriptive metadata, channel lineups, and on-demand content navigation hierarchies. Content protection may comprise realtime content encryption and license generation services. Session management may comprise realtime, policy based allocation of on-demand and linear video sessions. And the recommendation engine may comprise generation of end user facing content recommendations based on viewer preferences.

Furthermore, in the growing TV ecosystem, plurality of backend services 125 may be extending to include platform external services that contribute to the user experience. This extended group may comprise, but is not limited to, social media systems and enriched metadata sources.

UX application 160 may comprise a "thin" client application. For example, UX application 160 may comprise a minimal client resident UX application that may deliver, for example, the view layer of a TV application experience to a user operating client device 110. UX application 160's behavior may be fully data driven from the cloud and may have no independent user interaction capability. In each cloud interaction, UX application 160 may receive a full defined set of resources. The full defined set of resources may comprise text, images, graphical templates, textures, etc., to display to the end user on client device 110. The full defined set of resources may further comprise personalized next step user interactions and how to report these back to UI engine 135 in application server 105. UX application 160 may interact with native device services for, content consumption functions, user input handling, device settings, and local GPU and rendering services when leveraged.

Figure 2A:
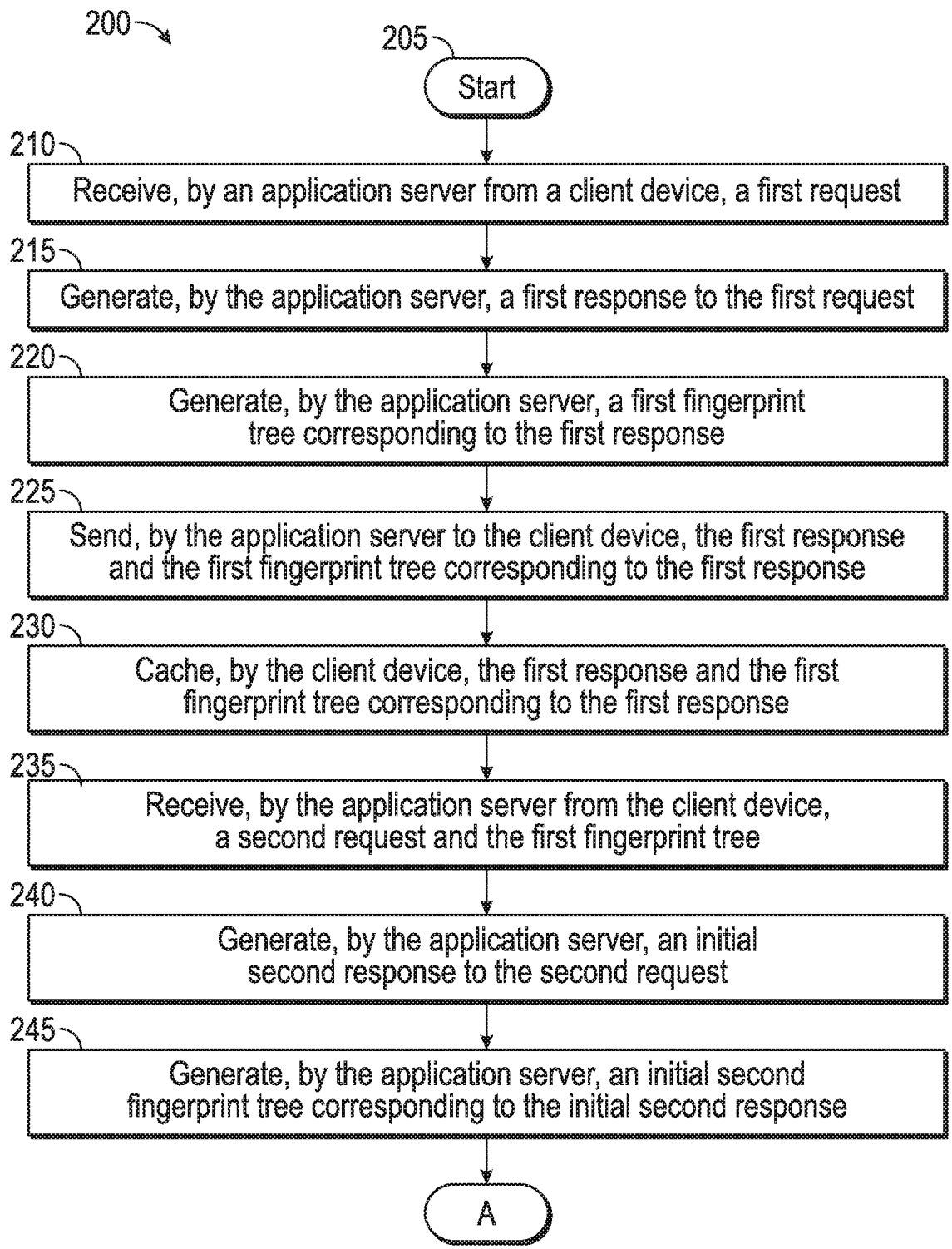
FIGS. 2A and 2B show a flow chart of a method for providing metadata management.
Figure 2B:
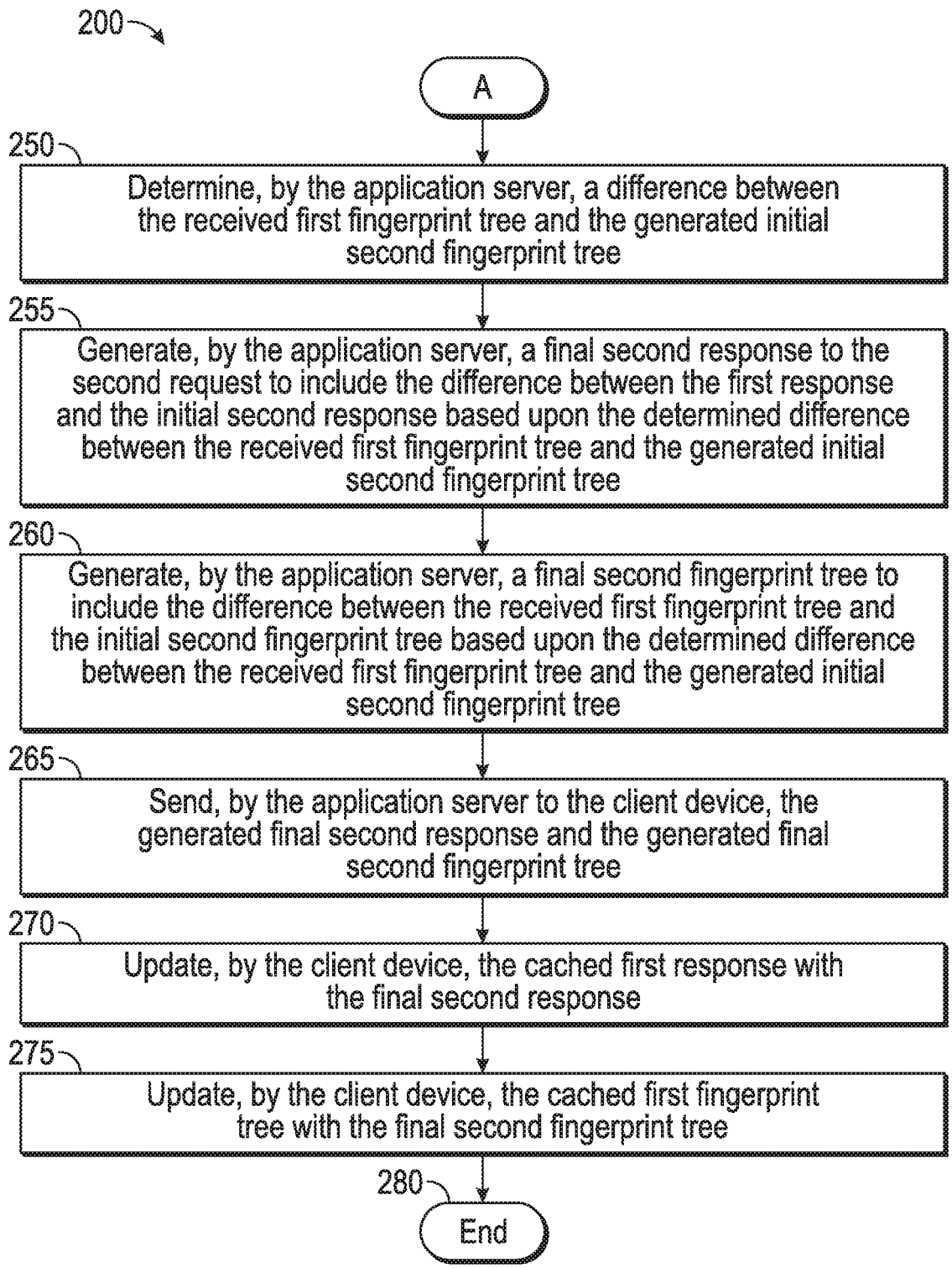

FIGS. 2A and 2B are a flow chart setting forth the general stages involved in a method 200 consistent with an embodiment of the disclosure for providing metadata management. Method 200 may be implemented using, for example, application server 105 and client device 110 as described above with respect to FIG. 1. Ways to implement the stages of method 200 will be described in greater detail below.

Method 200 may begin at starting block 205 and proceed to stage 210 where application server 105 may receive a first request from client device 110. For example, a user may be using client device 110 and navigating, for example, through a video guide UI presented to the user on a screen by UX application 160. In doing so, the user may make a certain selection (e.g., request a Hub screen) by taping a button on a touch screen or a button on a remote control for example. This selection may cause UX application 160 to generate the first request and send the first request to application server 105.

From stage 210, where application server 105 receives the first request from client device 110, method 200 may advance to stage 215 where application server 105 may generate a first response to the first request. For example, UI engine 135 may receive the first request and pass it along to aggregator 130. Aggregator 130 may interface with any one or more of plurality of backend services 125 to develop the first response to the first request and pass the first response onto UI engine 135. For example, FIGS. 3A and 3B shows sample metadata for the first response (e.g., the Hub screen in JSON format). This example may include the model and the controller logic for the Hub screen.

Once application server 105 generates the first response to the first request in stage 215, method 200 may continue to stage 220 where application server 110 may generate a first fingerprint tree corresponding to the first response. For example, the first fingerprint tree of the first response may be structured the same as the first response. The first fingerprint tree may uniquely identify the structure of the first response and the first response itself from which the first fingerprint tree is generated. The first fingerprint tree may be calculated using any fingerprint algorithms, for example, the Rabin fingerprint algorithm, a hash function, a cryptographic hash function, or a cyclic redundancy check (CRC).

Figure 4:
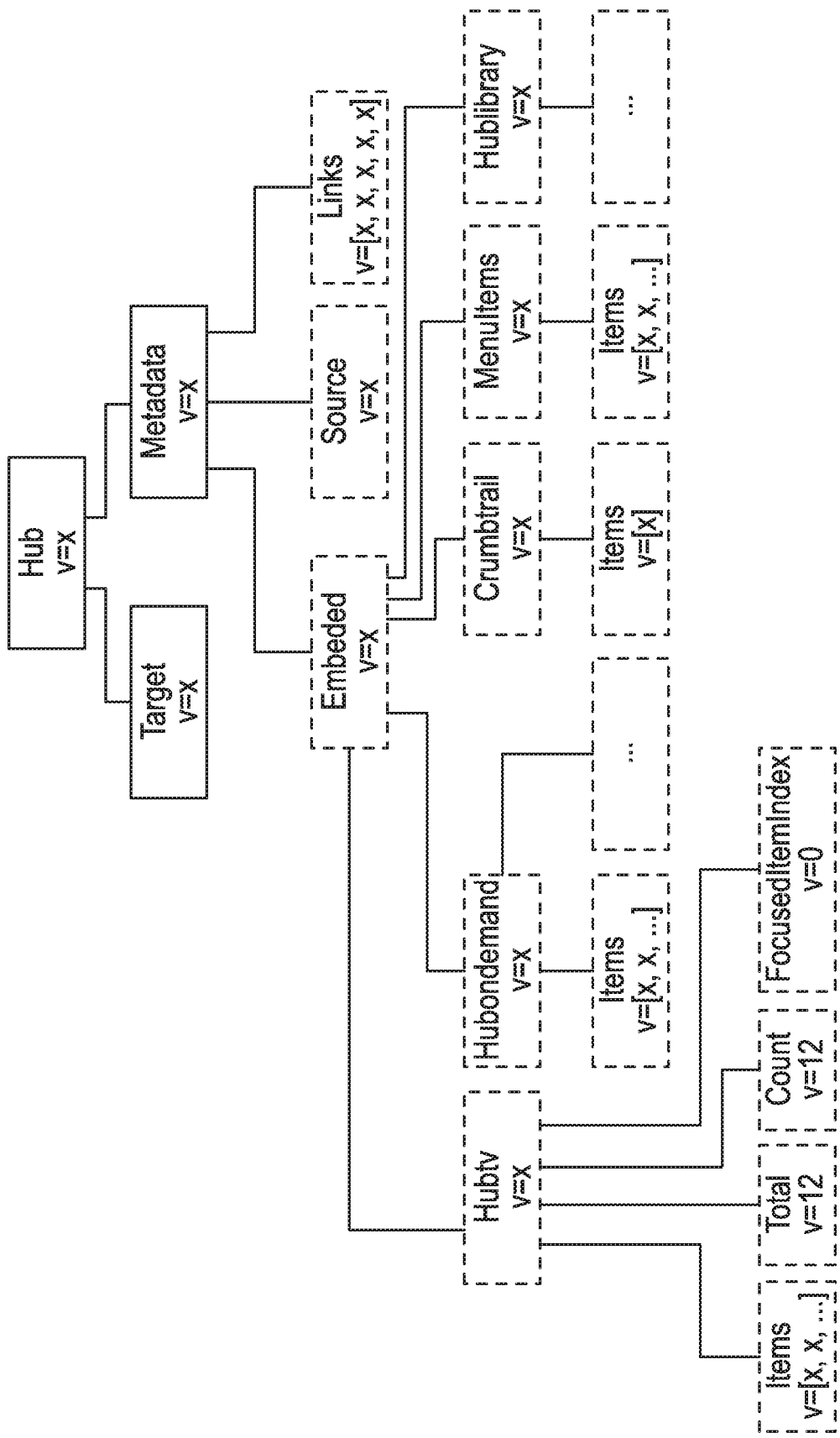
FIG. 4 shows the first fingerprint tree corresponding to the first response.

For each metadata object in the first response, a fingerprint may be calculated based on the value of the interested key of the object and the fingerprint may be associated with that key. For the finest granularity of the first fingerprint tree, a fingerprint may be calculated for every video event or metadata object in the first response. The first fingerprint tree may be formed when fingerprints are calculated for one, some, or all of the interested metadata objects in the first response. FIG. 4 shows the first fingerprint tree corresponding to the first response. As shown in FIG. 4, the first fingerprint tree may be generated where "v" is the fingerprint value for that node.

After application server 105 generates the first fingerprint tree corresponding to the first response in stage 220, method 200 may proceed to stage 225 where application server 105 may send the first response and the first fingerprint tree corresponding to the first response to client device 110. For example, the first response (e.g., shown in FIGS. 3A and 3B) and the first fingerprint tree (e.g., shown in FIG. 4) may be delivered to client device 110 as the response message of the aforementioned Hub request. Client device 110 may render the first response to a screen on client device 110. In another example, application server 105 may not send the first fingerprint tree corresponding to the first response to client device 110. Instead, application server 105 may cache the first fingerprint tree corresponding to the first response in memory or storage on application server 105 or at any location accessible by application server 105. In this example, the cached first fingerprint tree may be tagged with information linking it to the first request, client device 110, or the user using client device 110.

From stage 225, where application server 105 sends the first response and the first fingerprint tree corresponding to the first response to client device 110, method 200 may advance to stage 230 where client device 110 may cache the first response and the first fingerprint tree corresponding to the first response. For example, client device 110 may store both the first response and the first fingerprint tree locally on client device 110. In the example where application server 105 may not send the first fingerprint tree corresponding to the first response to client device 110, client device 110 may not cache the first fingerprint tree corresponding to the first response.

Once client device 110 caches the first response and the first fingerprint tree corresponding to the first response in stage 230, method 200 may continue to stage 235 where application server 105 may receive a second request and the first fingerprint tree from client device 110. For example, the user may be continuing to use client device 110 and navigating, for example, through the video guide UI presented to the user on a screen by UX application 160. In doing so, the user may re-make the previous selection (e.g., re-request the Hub screen) by taping a button on a touch screen or a button on a remote control for example. This selection may cause UX application 160 to generate the second request and send the second request to application server 105. Client device 110 may also send the previously received first fingerprint tree along with the second request to application server 105. In other words, for any future Hub screen request, client device 110 may send the fingerprint tree it cached (i.e., the first fingerprint tree) back to application server 105. In another example, instead of receiving the first fingerprint tree from client device 110, application server 105 may retrieve the first fingerprint tree it previously cached in memory or storage on application server 105 or at any location accessible by application server 105.

After application server 105 receives the second request and the first fingerprint tree from client device 110 in stage 235, method 200 may proceed to stage 240 where application server 105 may generate an initial second response to the second request. For example, UI engine 135 may receive the second request and pass it along to aggregator 130. Aggregator 130 may interface with any one or more of plurality of backend services 125 to develop the initial second response to the second request and pass the initial second response onto UI engine 135. Because time has passed, even though the user may have re-selected the same button, the initial second response may be slightly different from the first response. For example, the metadata for the initial second response may be slightly different from the metadata for the first response shown in FIGS. 3A and 3B (e.g., the Hub screen in JSON format).

From stage 240, where application server 105 generates the initial second response to the second request, method 200 may advance to stage 245 where application server 105 may generate an initial second fingerprint tree corresponding to the initial second response. For example, the initial second fingerprint tree of initial second response may be structured the same as the initial second response. The initial second fingerprint tree may uniquely identify the structure of the initial second response and the initial second response itself from which the initial second fingerprint tree is generated. The initial second fingerprint tree may be calculated using any fingerprint algorithms, for example, the Rabin fingerprint algorithm, a hash function, a cryptographic hash function, or a cyclic redundancy check (CRC).

For each metadata object in the initial second response, a fingerprint may be calculated based on the value of the interested key of the object and the fingerprint may be associated with that key. For the finest granularity of the fingerprint tree, a fingerprint may be calculated for every video event or metadata object in the initial second response. The initial second fingerprint tree may be formed when fingerprints are calculated for one, some, or all of the interested metadata objects in the initial second response. Because the initial second response is slightly different from the first response, the initial second fingerprint tree for the initial second response will be slightly different from the first fingerprint tree shown in FIG. 4.

Once application server 105 generates the initial second fingerprint tree corresponding to the initial second response in stage 245, method 200 may continue to stage 250 where application server 105 may determine a difference between the first fingerprint tree and the generated initial second fingerprint tree. For example, application server 105 may perform an element-by-element comparison of the first fingerprint tree with the initial second fingerprint tree it generated for the initial second response. Application server 105 may keep track of the differences found by the element-by-element comparison. Again, application server 105 may receive the first fingerprint tree from client device 110 or it may retrieve the first fingerprint tree from storage on application server 105 or from any location accessible by application server 105.

After application server 105 determines the difference between the first fingerprint tree and the generated initial second fingerprint tree in stage 250, method 200 may proceed to stage 255 where application server 105 may generate a final second response to the second request to include the difference between the first response and the initial second response based upon the determined difference between the first fingerprint tree and the generated initial second fingerprint tree. For example, FIG. 5 shows sample metadata for the final second response (e.g., in JSON format). The final second response may include the difference between the first response and the initial second response as indicated by the element-by-element comparison of the first fingerprint tree with the initial second fingerprint tree that application server 105 generated for the initial second response.

Figure 6:
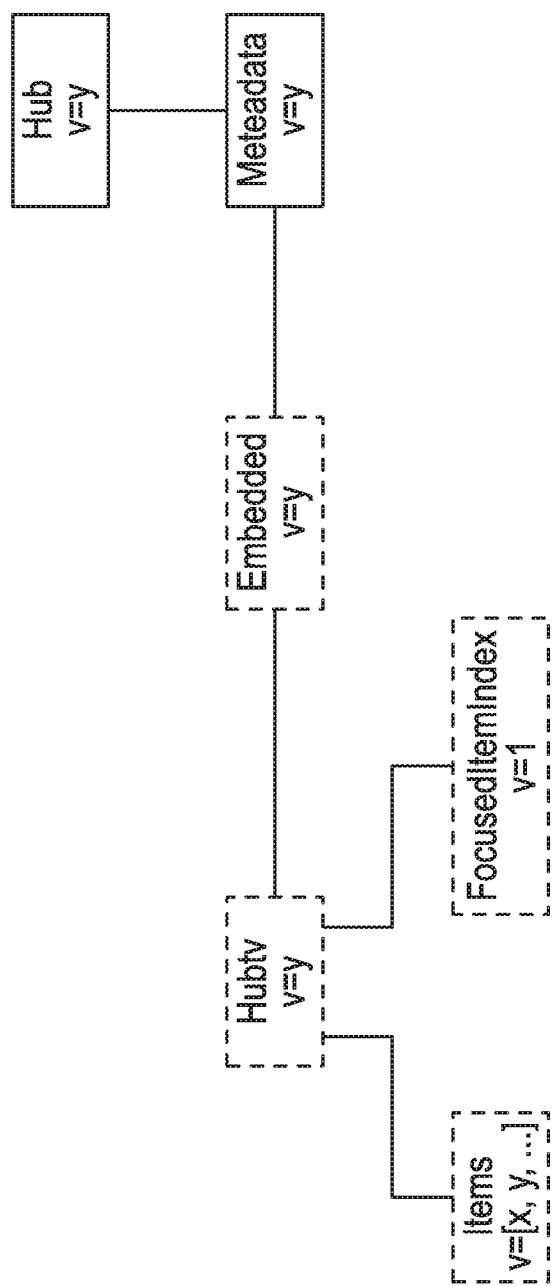
FIG. 6 shows the final second fingerprint tree corresponding to the final second response.

From stage 255, where application server 105 generates the final second response to the second request to include the difference between the first response and the initial second response based upon the determined difference between the first fingerprint tree and the generated initial second fingerprint tree, method 200 may advance to stage 260 where application server 105 may generate a final second fingerprint tree to include the difference between the first fingerprint tree and the initial second fingerprint tree based upon the determined difference between the first fingerprint tree and the generated initial second fingerprint tree. For example, FIG. 6 shows the final second fingerprint tree corresponding to the final second response. The final second fingerprint tree may include the difference between the first fingerprint tree and the initial second fingerprint tree that application server 105 generated for the initial second response as indicated by the aforementioned element-by-element comparison.

Once application server 105 generates the final second fingerprint tree to include the difference between the first fingerprint tree and the initial second fingerprint tree based upon the determined difference between the first fingerprint tree and the generated initial second fingerprint tree in stage 260, method 200 may continue to stage 265 where application server 105 may send the generated final second response and the generated final second fingerprint tree to client device 110. Because the file shown in FIGS. 3A and 3B is much small than the file shown in FIG. 5, less bandwidth is used in sending a file of the size shown in FIG. 5 over sending a file of the size shown in FIGS. 3A and 3B. In another example, application server 105 may not send the generated final second fingerprint tree to client device 110. Instead, application server 105 may cache the generated final second fingerprint tree in memory or storage on application server 105 or at any location accessible by application server 105. This may further free up bandwidth. In this example, the generated final second fingerprint tree can be tagged with information linking it to the first request, client device 110, or the user using client device 110.

After application server 105 sends the generated final second response and the generated final second fingerprint tree to client device 110 in stage 265, method 200 may proceed to stage 270 where client device 110 may update the cached first response with the final second response. For example, when the cached first response is updated with the final second response, the updated cached first response becomes the same as the initial second response and can be used to service the second request. In other words, client device 110 may render to a screen the updated cached first response to service the second request.

From stage 270, where client device 110 updates the cached first response with the final second response, method 200 may advance to stage 275 where client device 110 may update the cached first fingerprint tree with the final second fingerprint tree. In this way the updated cached first fingerprint tree my now correspond to the updated cached first response. In the example where application server 105 may not send the generated final second fingerprint tree to client device 110, client device 110 may not update the cached first fingerprint tree with the final second fingerprint tree. Instead, application server 105 may update the cached first fingerprint tree (e.g., that it stored in memory or storage on application server 105 or at any location accessible by application server 105) with the final second fingerprint tree. In this way the updated cached first fingerprint tree my now correspond to the updated cached first response (on client device 110). Once client device 110 updates the cached first fingerprint tree with the final second fingerprint tree in stage 275, method 200 may then end at stage 280.

Figure 7:
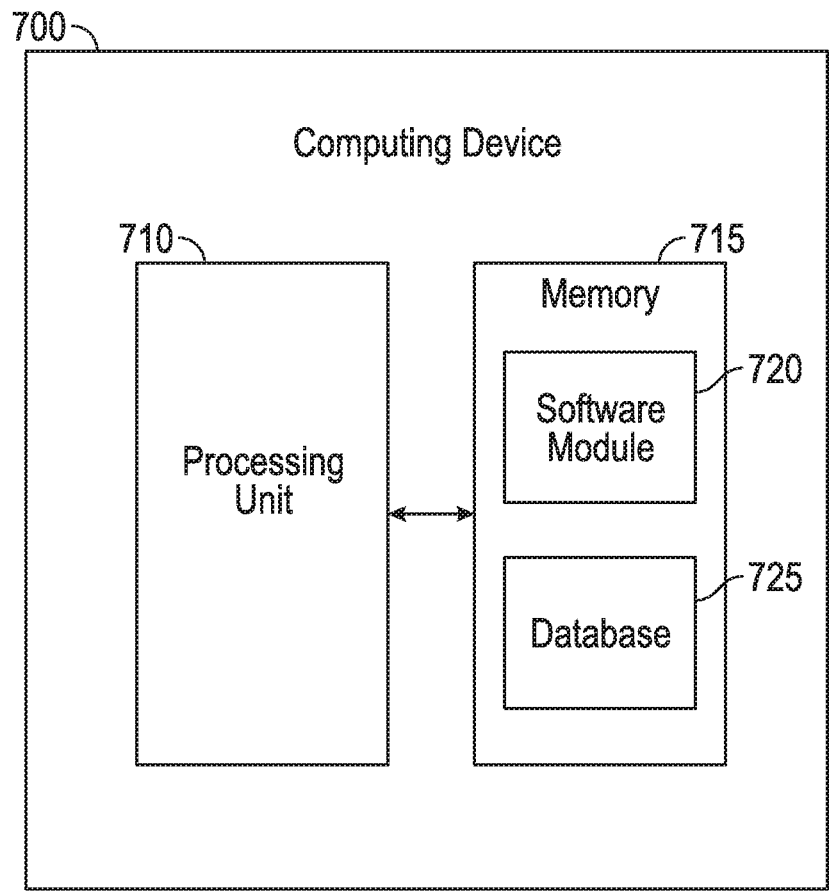
FIG. 7 shows a computing device.

FIG. 7 shows a computing device 700. As shown in FIG. 7, computing device 700 may include a processing unit 710 and a memory unit 715. Memory unit 715 may include a software module 720 and a database 725. While executing on processing unit 710, software module 720 may perform processes for providing metadata management, including for example, any one or more of the stages from method 200 described above with respect to FIG. 2A and FIG. 2B. Computing device 700, for example, may provide an operating environment for any one or more of the devices in cloud based delivery system 100 including, but not limited to, application server 105, client device 110, gateway 120, and any one or more of plurality of backend services 125.

Computing device 700 may be implemented using a Wi-Fi access point, a cloud-based server, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by an application server, a first request;
   generating, by the application server, a first response to the first request;
   generating, by the application server, a first fingerprint tree corresponding to the first response, wherein the first fingerprint tree uniquely identifies a first structure of the first response;
   sending, by the application server, the first response and the first fingerprint tree corresponding to the first response;
   receiving, by the application server, a second request and the first fingerprint tree;
   generating, by the application server, an initial second response to the second request;
   generating, by the application server, an initial second fingerprint tree corresponding to the initial second response;
   determining, by the application server, a difference between the received first fingerprint tree and the generated initial second fingerprint tree, wherein determining the difference comprises element by element comparison of the received first fingerprint tree with the generated initial second fingerprint tree;

generating, by the application server, a final second response to the second request to include the difference between the first response and the initial second response based upon the determined difference between the received first fingerprint tree and the generated initial second fingerprint tree;

generating, by the application server, a final second fingerprint tree to include the difference between the received first fingerprint tree and the initial second fingerprint tree based upon the determined difference between the received first fingerprint tree and the generated initial second fingerprint tree; and sending, by the application server, the generated final second response and the generated final second fingerprint tree.

2. The method of claim 1, further comprising:
receiving, by a client device, the first response and the first fingerprint tree corresponding to the first response; and
caching, by the client device, the first response and the first fingerprint tree corresponding to the first response.

3. The method of claim 2, wherein sending, by the application server, the generated final second response and the generated final second fingerprint tree comprises sending the generated final second response and the generated final second fingerprint tree to the client device.

4. The method of claim 3, further comprising updating, by the client device, the cached first response with the final second response.

5. The method of claim 3, further comprising updating, by the client device, the cached first fingerprint tree with the final second fingerprint tree.

6. The method of claim 1, wherein receiving, by the application server, a second request and the first fingerprint tree comprises receiving, by the application server, the second request and the first fingerprint tree from a client device.

7. The method of claim 1, wherein generating the first response to the first request comprises generating the first response comprising a first plurality of associated objects having the first structure.

8. The method of claim 7, wherein generating the first fingerprint tree comprises:
generating a first plurality of fingerprints wherein each one of the first plurality of fingerprints respectively corresponds to each one of the first plurality of associated objects; and
associating the first plurality of fingerprints within the first fingerprint tree according to the first structure.

9. The method of claim 8, wherein generating the first plurality of fingerprints comprises using at least one of the following: a Rabin fingerprint algorithm; a hash function; a cryptographic hash function; and a cyclic redundancy check (CRC).

10. The method of claim 1, wherein generating the initial second response to the second request comprises generating the second response comprising a second plurality of associated objects having a second structure.

11. The method of claim 10, wherein generating the initial second fingerprint tree comprises:
generating a second plurality of fingerprints wherein each one of the second plurality of fingerprints respectively corresponds to each one of the second plurality of associated objects; and
associating the second plurality of fingerprints within the initial second fingerprint tree according to the second structure.

12. A method comprising:
receiving, by an application server, a first request;
generating, by the application server, a first response to the first request;
generating, by the application server, a first fingerprint tree corresponding to the first response wherein the first fingerprint tree uniquely identifies a first structure of the first response;
sending, by the application server, the first response;
caching, by the application server, the first fingerprint tree corresponding to the first response;
receiving, by the application server, a second request;
retrieving, by the application server in response to receiving the second request, the cached first fingerprint tree;
generating, by the application server, an initial second response to the second request;
generating, by the application server, an initial second fingerprint tree corresponding to the initial second response;
determining, by the application server, a difference between the retrieved first fingerprint tree and the generated initial second fingerprint tree, wherein determining the difference comprises element by element comparison of the received first fingerprint tree with the generated initial second fingerprint tree;
generating, by the application server, a final second response to the second request to include the difference between the first response and the initial second response based upon the determined difference between the retrieved first fingerprint tree and the generated initial second fingerprint tree;
generating, by the application server, a final second fingerprint tree to include the difference between the retrieved first fingerprint tree and the initial second fingerprint tree based upon the determined difference between the retrieved first fingerprint tree and the generated initial second fingerprint tree; and
sending, by the application server, the generated final second response.

13. The method of claim 12, wherein receiving the second request comprises receiving the second request from a client device.

14. The method of claim 12, wherein sending the generated final second response comprises sending the generated final second response to a client device.

15. The method of claim 12, wherein:
generating the first response to the first request comprises generating the first response comprising a first plurality of associated objects having the first structure; and
generating the first fingerprint tree comprises:
generating a first plurality of fingerprints wherein each one of the first plurality of fingerprints respectively corresponds to each one of the first plurality of associated objects; and
associating the first plurality of fingerprints within the first fingerprint tree according to the first structure.

16. A system comprising:
a memory storage; and
a processing unit coupled to the memory storage, wherein the processing unit is operative to:
send a first request;
receive, in response to sending the first request, a first response and a first fingerprint tree corresponding to the first response wherein the first fingerprint tree uniquely identifies a structure of the first response;

cache the first response and the first fingerprint tree corresponding to the first response;

send a second request and the first fingerprint tree;

receive, in response to sending the second request and the first fingerprint tree, a final second response and a final second fingerprint tree, the final second fingerprint tree comprising a difference between the first fingerprint tree and an initial second fingerprint tree and the final second response comprising a difference between the first response and an initial second response, wherein the difference is determined by element by element comparison of the received first fingerprint tree with the generated initial second fingerprint tree;

update the cached first response with the final second response; and update the cached first fingerprint tree with the final second fingerprint tree.

17. The system of claim 16, wherein the processing unit is further operative to render the first response.

18. The system of claim 16, wherein the processing unit is further operative to render the updated cached first response.

19. The system of claim 16, wherein the initial second response corresponds to the second request.

20. The system of claim 16, wherein the initial second fingerprint tree corresponds to the initial second response.

* * * * *